United States Patent
Zhong et al.

(10) Patent No.: US 8,410,229 B2
(45) Date of Patent: Apr. 2, 2013

(54) POLYURETHANE-MODIFIED ACRYLIC RESIN AND PREPARING METHOD THEREOF

(75) Inventors: Wenjun Zhong, Chengdu (CN); Guangming Li, Chengdu (CN); Mingguo Zou, Chengdu (CN)

(73) Assignee: Wenjun Zhong, Chengdu, Sichuan (CN)

( * ) Notice: Subject to any disclaimer, the term of this patent is extended or adjusted under 35 U.S.C. 154(b) by 0 days.

(21) Appl. No.: 13/308,109

(22) Filed: Nov. 30, 2011

(65) Prior Publication Data

US 2012/0142871 A1 Jun. 7, 2012

Related U.S. Application Data

(63) Continuation of application No. PCT/CN2010/072430, filed on May 4, 2010.

(51) Int. Cl.
*C08F 226/02* (2006.01)
*C08F 2/06* (2006.01)

(52) U.S. Cl. .................. 526/75; 526/301; 526/329.5

(58) Field of Classification Search .................. 526/301, 526/329.5; 524/555, 560, 563
See application file for complete search history.

(56) References Cited

U.S. PATENT DOCUMENTS

| 3,208,963 A | 9/1965 | Jasinski |
| 5,073,611 A * | 12/1991 | Rehmer et al. ................ 526/208 |
| 6,635,706 B1 | 10/2003 | Petschke et al. |

FOREIGN PATENT DOCUMENTS

| CN | 1074470 A | 7/1993 |
| CN | 1664032 A | 9/2005 |
| CN | 1740257 A | 3/2006 |
| CN | 101157749 A | 4/2008 |

* cited by examiner

*Primary Examiner* — Vu A Nguyen
(74) *Attorney, Agent, or Firm* — Knobbe Martens Olson & Bear LLP

(57) ABSTRACT

A polyurethane-modified acrylic resin and a preparing method thereof are disclosed. The polyurethane-modified acrylic resin is prepared through the following steps: preparing a monomer with double bond and urethane group by means of a reaction of isocyanate, hydroxylalkyl acrylate and aliphatic alcohol, and then copolymerizing the monomer with acrylate monomer. The polyurethane-modified acrylic resin of the present invention contains a urethane structure, has the features of both polyurethane and acrylic resin, and is soluble in alcohol or ester solvent. An ink, a laminating adhesive, a metal surface-protective coating and a gloss varnish for woodware produced from the resin as well as the preparing methods thereof are also disclosed.

20 Claims, 1 Drawing Sheet

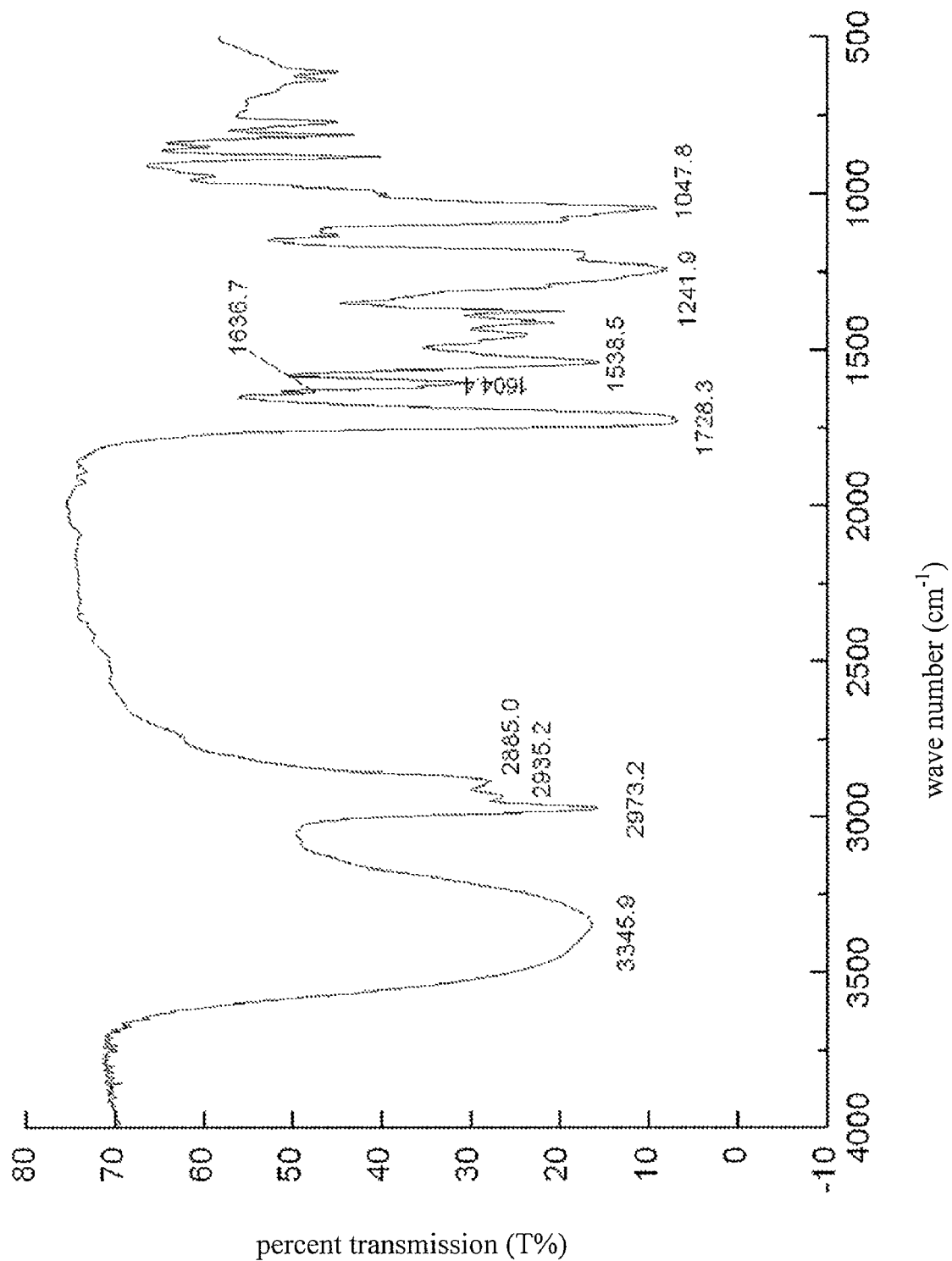

POLYURETHANE-MODIFIED ACRYLIC RESIN AND PREPARING METHOD THEREOF

RELATED APPLICATIONS

This application is a continuation of International Application No. PCT/CN2010/072430, filed May 4, 2010, which claims priority to Chinese Patent Application No. 200910059474.2, filed Jun. 1, 2009.

TECHNICAL FIELD

The invention relates to a polyurethane-modified acrylic resin and a process for preparation thereof, which belongs to the field of polymer chemistry.

BACKGROUND

A polyurethane molecule contains a great number of urethane links, ester bonds, ether links and so on. Coating films of polyurethane are excellent in solvent resistance, wearing resistance, scratching resistance, good flexibility and elasticity, etc. Polyurethane resin exhibits strong adhesion to substrate and high peeling strength, but it is relatively expensive. On the other hand, acrylic resins are suitable for various solvents, are excellent in weather-resistance, even under the condition of relatively high temperature and/or UV radiation, acrylic resins do not decompose easily and do not change to yellow-color. Acrylic resins have wide applicability, and low production costs; but they have disadvantages of poor adhesion to substrate when used in certain cases and give unsatisfied laminating strength. Chinese patent publication No. CN100480288C provides an alcohol-soluble acrylic resin, which has fairly good performances when being used in an ink for printing on plastics, but some important functions, especially the adhesion to substrate needs to be further improved. Chinese patent publication No. CN1035772C provides a process for preparation of an acrylic adhesive, in which a laminated film produced by using the adhesive has an initial peeling strength of 2N/2.5 cm (i.e. 1.2N/15 mm). Chinese patent application with publication No. CN1740257A provides an acrylic adhesive, which has a peeling strength of 1.0 N/15 mm when being used as a laminated film; however, a further improved adhesion and laminating strength thereof, especially for laminated films of PET/LDPE and PA/LDPE, are still needed to be improved. Therefore, there is a demand for developing a novel and modified resin, which could combine the advantages of polyurethane resin with that of acrylic resin, and could overcome drawbacks with each other at the same time when being used for preparing ink, laminating adhesive and gloss varnish for woodware.

Recently, more researches focus on modification of acrylic resins, but most of them regarding polyurethane-modified acrylic resins are limited to synthesis of polyurethane-acrylic resin emulsions. The preparation of polyurethane-modified acrylic resin emulsions and their application in coatings are introduced in CN1664032, CN101157749 and U.S. Pat. No. 6,635,706. However, such polyurethane-modified acrylic resin composite emulsions are utilized only in the field of coatings, they are not suitable for preparing ink products, laminating adhesive, gloss varnish for woodware, or the like. The present inventors believe that the polymer products prepared by different methods have different functions and applications. Emulsion polymerization is a heterogeneous polymerization, so that the polymer emulsion is a dispersion of latex particles in water. Solution polymerization is performed in a solution and the product obtained is solvent-based type. In subsequent applications, the polymer solution forms a fine and tight polymer film after volatilization of the solvent and solidification; while the polymer emulsion forms a coat film via the dispersed latex particles penetrating and diffusing with one another and then aggregating to an integral at a temperature higher than the minimum film-forming temperature of the emulsion. The synthetic resins obtained by emulsion polymerization and by solution polymerization respectively have different properties and applications due to their different film-forming mechanisms. So far, however, there is no report regarding research of synthetic polyurethane-modified acrylic resin prepared by solution polymerization.

SUMMARY OF THE INVENTION

One object of the invention is to provide a novel polyurethane-modified acrylic resin, which overcomes the defects in properties of the above-mentioned polyurethane resin and acrylic resin.

Another object of the invention is to provide a process for preparation of the novel polyurethane-modified acrylic resin and application of the resin.

The polyurethane-modified acrylic resin in this invention is prepared from the following monomers by solution polymerization with alcohol and/or ester as the solvent.

| Monomer | Amount, parts by weight |
| --- | --- |
| monomer containing C=C and —NHCOO— | 2-10 |
| vinyl acetate | 30-60 |
| acrylic esters | 22-55 |
| compounds containing active functional groups | 6-15 |

An initiator, such as azo-bis-isobutyronitrile and/or benzoylperoxide, amount of 0.2-1.1%, preferably 0.2-0.9% based on the total weight of the above monomers, is added. The reaction temperature is preferably at 70-85° C., more preferably at 80° C. The number average molecular weight (Mn) of the polyurethane-modified acrylic resin is 10,000-80,000, preferably 30,000-50,000. The obtained polyurethane-modified acrylic resin solution has preferably a solid content of 40 wt %-70 wt %.

Preferably, the raw materials components for preparation of the present polyurethane-modified acrylic resin are as follows:

| Monomer | Amount, parts by weight |
| --- | --- |
| monomer containing C=C and —NHCOO— | 4-8 |
| vinyl acetate | 40-55 |
| acrylic esters | 30-50 |
| compounds containing active functional groups | 6-10 |

The monomer containing C=C and —NHCOO— is prepared by: reaction of diisocyanate:hydroxylalkyl acrylate:aliphatic alcohol=1:1:1 (in mole ratio) or monoisocyanate:hydroxylalkyl acrylate=1:1 (in mole ratio), using ethyl acetate as solvent, under catalysis by a catalyst such as organic tin compounds under a reaction temperature preferably at 40-50° C., more preferably 40-45° C., preferably for 3-5 hours, more preferably for 4 hours. In the present process, the reaction can be performed sufficiently until —NCOs are completely consumed by controlling the specific ratio of the raw materials and by slowly adding hydroxylalkyl acrylate dropwise. The mono-isocyanate may be methyl isocyanate and/or ethyl isocyanate; the diisocyanate may be any one or a mixture of two or more selected from Toluene diisocyanate (TDI), Methylene diphenyl diisocyanate (MDI), 1,6-Diisocyanatohexane (HDI), isophorone diisocyanate (IPDI), xylyl diisocyanate and 1,5-Naphthalene diisocyanate. The hydroxylalkyl acrylate may be 2-hydroxyethyl(meth)acrylate and/or 2-hydroxylpropyl(meth)acrylate. The aliphatic alcohol may be aliphatic monobasic alcohol, preferably aliphatic monohydric alcohol with 10 or less carbon atoms, most preferably aliphatic monohydric alcohol with 4 or less carbon atoms.

The acrylic esters may be any one or a mixture of two or more selected from methyl(meth)acrylate, ethyl(meth)acrylate, butyl(meth)acrylate, isooctyl acrylate and glycidyl(meth)acrylate.

The organic tin catalyst may preferably be stannous octanoate and/or dibutyltin dilaurate.

The alcohol- and/or ester solvents may be any one or a mixture of two or more selected from ethanol, isopropanol and ethyl acetate.

The compounds containing active functional groups may be any one or a mixture of two or more selected from unsaturated monobasic acid, unsaturated dibasic acid, hydroxylalkyl ester of unsaturated acid, epoxy compound, unsaturated amide and N-hydroxylalkyl amide. The unsaturated monobasic acid may be acrylic acid and/or methacrylic acid. The unsaturated dibasic caybonxylic acid may be butene dicacid. The ester of unsaturated acid may be hydroxylethyl(meth)acrylate and/or hydroxylpropyl(meth)acrylate. The epoxy compound may be glycidyl(meth)acrylate and/or an ester produced by reaction of an unsaturated acid with a diepoxides The unsaturated amide may be acrylamide and/or methacrylamide. The unsaturated N-hydroxylalkyl amide may be hydroxylmethyl acrylamide.

The typical structure of the polyurethane-modified acrylic resin of the present invention may be represented by Formula 1:

Formula 1:

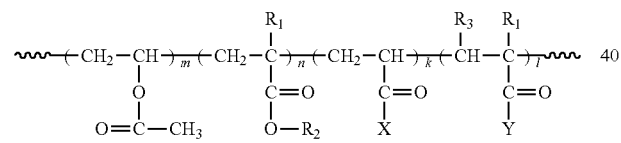

In Formula 1, $R_1$ is H or $CH_3$; $R_2$ is $CH_3$, $C_2H_5$, $C_4H_9$, $C_8H_{17}$ or the like; $R_3$ is H or COOH;

X is

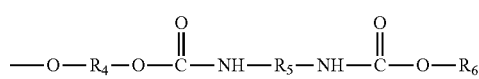

in which $R_4$ is $C_2H_4$ or $C_3H_6$, $R_5$ is

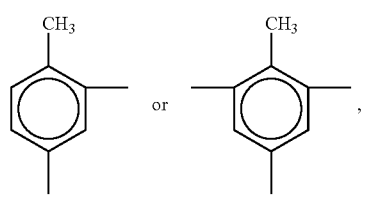

$R_6$ is $C_2H_7$;

Y is OH, $NH_2$ or

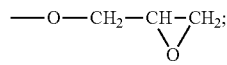

each of m, n, k and l is independently 0 or a positive integer.

The particular process for preparation of the polyurethane-modified acrylic resin of the present invention comprises the following steps:

(1) weighing raw materials according to the ratio of diisocyanate:hydroxylalkyl acrylate:aliphatic alcohol=1:1:1 (mole ratio) or according to the ratio of monoisocyanate:hydroxylalkyl acrylate=1:1 (mole ratio), using an ester such as ethyl acetate as a solvent, adding the above into a reactor, preferably adding in batches into the reactor, adding a catalyst such as organic tin-based catalyst, and reacting the above for a period at a reaction temperature to obtain a monomer containing C=C and —NHCOO—, wherein the reaction temperature is preferably at 40-50° C., more preferably 40-45° C., and the reaction time is preferably 3-5 hours, more preferably 4 hours;

(2) weighing raw materials having the ratios as below

| component | | Amount, parts by weight |
|---|---|---|
| component A | vinyl acetate | 15-30 |
| | acrylic esters | 5-12 |
| | solvent (alcohol and/or ester) | 10-35%, preferably 20-30% of the total weight of vinyl acetate and acrylic esters |
| component B | monomer containing C=C and —NHCOO— | 2-10 |
| | vinyl acetate | 15-30 |
| | acrylic esters | 17-43 |
| | compounds containing active functional groups | 6-15 |
| | initiator | 0.1-0.7%, preferably 0.1-0.6% of the total weight of vinyl acetate, acrylic esters, monomer containing C=C and —NHCOO—, and compounds containing active functional groups, which are contained in component A and component B |
| component C | Initiator | 0.1-0.4%, preferably 0.1-0.3% of the total weight of vinyl acetate, acrylic esters, monomer containing C=C and —NHCOO—, and compounds containing active functional groups, which are contained in component A and component B10-25 times of the amount of the initiator in component C; |
| | Solvent (alcohol and/or ester) | |

(3) adding component A into the reactor, stirring and heating to a reflux temperature;

(4) slowly adding component B into the reactor under stirring and at the reflux temperature, and reacting for 0.5-1.5 hours, preferably 1 hour after finishing the adding, wherein the time for dropwise addition is preferably 1.5-4 hours, more preferably 2-3 hours, and most preferably 3 hours;

(5) slowly adding component C by dropwise into the reactor following step (4), and reacting for 1-3 hours, preferably 2 hours after addition finished, wherein the dropwise addition is completed preferably in 0.25-0.75 hour, more preferably in 0.5 hour, and the temperature for reaction is preferably in between 70-85° C., more preferably at 80° C.;

(6) diluting the obtained product by adding an alcohol and/or ester according to the required concentration of the final product upon finishing step (5), stirring and cooling at the same time, and taking out when the substances in the reactor being cooled to a certain temperature so as to obtain a solution of the polyurethane-modified acrylic resin, wherein when taking out, the temperature of the substances in the reactor is preferably cooled to 50° C. or lower, preferably 30° C. or less, and the solid content of the polyurethane-modified acrylic resin is preferably 40 wt %-70 wt %.

In step (1) of the process, the diisocyanate may be any one or a mixture of two or more selected from Toluene diisocyanate, Methylene diphenyl diisocyanate, 1,6-Diisocyanato-hexane, isophorone diisocyanate, xylyl diisocyanate and 1,5-Naphthalene diisocyanate; the aliphatic alcohol may be aliphatic monobaisic alcohol, preferably aliphatic monobasic-alcohol with 10 or less carbon atoms, most preferably aliphatic monobasic-alcohol with 4 or less carbon atoms; the monoisocyanate may be methyl isocyanate and/or ethyl isocyanate; the hydroxylalkyl acrylate may be hydroxylethyl (meth)acrylate and/or hydroxylpropyl(meth)acrylate; the catalyst may be an organic tin catalyst, which is preferably stannous octanoate and/or dibutyltin dilaurate. In step (2), the acrylate may be any one or a mixture of two or more selected from methyl(meth)acrylate, ethyl(meth)acrylate, butyl (meth)acrylate, isooctyl acrylate and glycidyl(meth)acrylate; the alcohol and/or ester may be any one or a mixture of two or more selected from ethanol, isopropanol and ethyl acetate; the initiator may be any one of or a mixture of azo-bis-isobutyronitrile and benzoylperoxide; the compound containing active functional group may be any one or a mixture of two or more selected from unsaturated monobasic acid, unsaturated dibasic acid, unsaturated acid hydroxylalkyl ester, epoxy compound, unsaturated amide and N-hydroxylalkyl amide, wherein the unsaturated monobasic acid may be acrylic acid and/or methacrylic acid, the unsaturated dibasic acid may be Butene diacid, the hydroxylalkyl ester of unsaturated acid may be hydroxylethyl(meth)acrylate and/or hydroxylpropyl(meth)acrylate, the epoxy compound may be glycidyl(meth)acrylate and/or an ester produced by reacting an unsaturated acid with a diepoxides compound, the unsaturated amide may be acrylamide and/or methacrylamide, the unsaturated N-hydroxylalkyl amide may be hydroxylmethyl acrylamide.

The present invention also provides a applications of the polyurethane-modified acrylic resin in printing ink, a laminating adhesive, a metal surface-protective coating or a gloss varnish for woodware.

The polyurethane-modified acrylic resin of the invention has the advantages from both the polyurethane and acrylic resin sides. Its properties are set forth as follows:

(1) wide uses: the resin of the present invention can be used in various fields such as ink product, laminating adhesive, metal surface-protective coating, gloss varnish for woodware and so on, while the polyurethane-acrylic emulsion resin is used only for coating;

(2) suitable for various substrates: when used in ink products, polyurethane resin is suitable for polyester film (PET), nylon film (PA), while acrylic resin is suitable for biaxially oriented polypropylene film (BOPP), uniaxially oriented polypropylene film (OPP), polyethylene film (PE), the resin of the present invention combines the advantageous properties of polyurethane with that of polyacrylic resin, and is suitable for printing various films such as BOPP, OPP, PET, PA, PE films and the like;

(3) improving laminating strength: when used as an adhesive, the T-style peeling strength of the polyurethane-modified acrylic resin prepared in the present invention is greater than 1.5N/15 mm, tested according to GB/T8808, where the coated amount of adhesive (dry) is about 3 g/m$^2$, The polyurethane-modified acrylic resin prepared in the present invention is suitable for the lamination of many substances, especially it can effectively improve the laminating strength (peeling strength) for polyester film and nylon film;

(4) low cost: the main raw material used in the present invention is vinyl acetate, which has abundant supply sources and low price, and t the production process is easy to control;

(5) environment-friendly: the resin of the present invention is solvable in an alcohol, an ester, or a mixed solvent of an alcohol or an ester with water, so that it favorable for the environmental protection.

In view of the above, the polyurethane-modified acrylic resin of the present invention is a polyurethane-acrylic composite resin having a combined advantages of polyurethane and of polyacrylate, the coat film of which has excellent mechanical properties and resistance to chemical degradation, in addition to its non-pollution, low energy consumption, convenience for execution and suitable for continuous production in industrial scope.

The present invention will be further illustrated in detail by means of the following examples, which should not be understood as limitation to the protection scope the invention. In the light of the above inventive techniques concept, any modification, replacement or variation to the invention by using the common knowledge and the common means known in the field shall be regarded as having fallen within the claimed protection scope of the invention.

BRIEF DESCRIPTION OF THE DRAWINGS

FIG. 1 is the infrared spectra of the monomer containing C═C and —NHCOO— of the invention (the sample is the product prepared in Example 2).

The monomer containing C═C and —NHCOO— prepared in Example 2 was characterized by infrared spectroscopy (IR). The result shows that the monomer contains C═C and —NHCOO— group, and the N═C═O reacted completely (its characteristic absorption band at 2280 cm$^{-1}$ has been disappeared). It can be seen from the FIGURE that 3345.9 cm$^{-1}$ is the absorption of N—H bond's stretching vibration; 1728.3 cm$^{-1}$ is the absorption of C═O bond's stretching vibration; 1538.5 cm$^{-1}$ is the absorption of N—H in-plane bending vibration; 1241.9 cm$^{-1}$ and 1047.8 cm$^{-1}$ are the absorptions of C—O (—C) bond(s)' stretching vibration(s). The above indicates that the monomer contains —NHCOO— group. In addition, 1636.7 cm$^{-1}$ and 1604.4 cm$^{-1}$ are the absorption peaks of C═C bond's stretching vibration, which indicates that the monomer contains C═C bond.

DETAILED DESCRIPTION

Example 1

Preparation of Monomer Containing C═C and —NHCOO—

The monomer containing C═C and —NHCOO— is prepared by the reaction of equal mole of monoisocyanate and hydroxylalkyl acrylate. In particular, the preparation comprises the steps: (1) weighing 5.13 kg (90 mol) of methylisocyanate and 15 kg of ethyl acetate solvent; (2) adding them into a reactor equipped with a stirring device, a reflux condenser, a heating and temperature control device and a device for dropwise addition; (3) adding 0.03 kg of stannous octanoate catalyst; (4) slowly adding 10.44 kg (90 mol) of hydroxylethyl acrylate dropwise, controlling the reaction temperature at 40-45° C. and reacting for 3 hours. Finally, 30.6 kg of monomer containing C=C and —NHCOO— with 50% concentration is obtained.

Example 2

Preparation of Monomer Containing C=C and —NHCOO—

The monomer containing C=C and —NHCOO— is prepared by the reaction of equal mole of diisocyanate, hydroxylalkyl acrylate and aliphatic alcohol. In particular, the preparation comprises steps: (1) weighing 6.96 kg (40 mol) of Toluene diisocyanate (TDI) and 14 kg of ethyl acetate solvent respectively; (2) adding them into a reactor equipped with a stirring device, a reflux condenser, a heating and temperature control device and a device for dropwise addition; (3) adding 0.026 kg of stannous octanoate catalyst; (4) slowly adding 5.2 kg (40 mol) of hydroxylethyl acrylate dropwise, controlling the reaction temperature at 40-50° C. and reacting for 2 hours; (5) adding 1.84 kg (40 mol) ethanol, reacting for additional 2 hours. Finally, 28 kg of monomer containing C=C and —NHCOO— with 50% concentration is obtained.

The monomer containing C=C and —NHCOO— prepared in Example 2 is characterized by infrared spectroscopy (IR), for details, refer to the drawing and the illustration thereof.

Example 3

Preparation of Polyurethane-Modified Acrylic Resin

A reactor is equipped with a stirring device, a reflux condenser, a heating and temperature control device and a device for dropwise addition. Mixed solutions respectively composed of the components listed below were added successively. Component A was added into the reactor firstly, stirred and heated to the reflux temperature at about 75° C. Then component B was slowly added dropwise into the reactor at the reflux temperature and the total time for addition was 1.5 hours, the reaction was continued at 75° C.-80° C. for 1.5 hours after addition. Component C was then slowly added into the reactor within about 0.75 hour. The temperature of the reactants was controlled at 75-80° C. and the reaction was continued for 1 hour; then, 35 kg of ethyl acetate and 25 kg of ethanol were added into the reactor and cooled with stirring; the substances in the reactor was taken out when the temperature therein was reduced to 50° C. or lower. Totally, 201 kg of polyurethane-modified acrylic resin having a solid content of 50% was prepared.

Weighing the raw materials according to the formulations below:

|   | Component | Amount |
|---|---|---|
| component A | vinyl acetate | 16 kg |
|   | butyl acrylate | 12 kg |
|   | ethanol | 6 kg |
| component B | Monomer containing C=C and —NHCOO— (prepared in example 2, concentration of 50%) | 4 kg (weight of the solution) |
|   | vinyl acetate | 17 kg |
|   | butyl acrylate | 20 kg |
|   | methyl methacrylate | 23 kg |
|   | acrylic acid | 5 kg |
|   | methacrylic acid | 5 kg |
|   | azo-bis-isobutyronitrile | 0.6 kg |
| component C | azo-bis-isobutyronitrile | 0.4 kg |
|   | ethanol | 5 kg |

The number average molecular weight (Mn) of the resin prepared in Example 3 was determined to be $4.0046 \times 10^4$ by gel permeation chromatography (GPC) with polystyrene as the standard reference.

The glass transform temperature of the resin prepared in Example 3 was determined to be 16.7° C. by differential scanning calorimetry (DSC).

Example 4

Preparation of Polyurethane-Modified Acrylic Resin

A reactor is equipped with a stirring device, a reflux condenser, a heating and temperature control device and a device for dropwise addition. Mixed solutions respectively composed of the components listed below were added successively. Component A was added into the reactor firstly, stirred and heated to the reflux temperature at about 75° C. Then component B was slowly added dropwise into the reactor at the reflux temperature, the total time for addition was 2 hours, the reaction was continued at 75° C.-80° C. for 1 hour after addition; component C was then slowly added in to the reactor within about 0.5 hour, the temperature of the reactants was controlled at 75-80° C. and the reaction was continued for 2 hours. Then, 30 kg of ethyl acetate and 50 kg of ethanol were added into the reactor and cooled with stirring; the substances in the reactor was taken out when the temperature therein was reduced to 50° C. or lower. Totally, 201.9 kg of polyurethane-modified acrylic resin having a solid content of 50% was prepared.

Weighing the raw materials according to the formulation below:

|   | Component | Amount |
|---|---|---|
| component A | vinyl acetate | 30 kg |
|   | methyl acrylate | 7 kg |
|   | ethanol | 11 kg |
| component B | monomer containing C=C and —NHCOO— (prepared in example 1, concentration of 50%) | 10 kg (weight of the solution) |
|   | vinyl acetate | 30 kg |
|   | methyl acrylate | 10 kg |
|   | butyl acrylate | 11 kg |
|   | acrylic acid | 2 kg |
|   | hydroxylethyl acrylate | 5 kg |
|   | azo-bis-isobutyronitrile | 0.7 kg |
| component C | azo-bis-isobutyronitrile | 0.2 kg |
|   | ethanol | 5 kg |

The glass-transition temperature of the resin prepared in Example 4 was determined to be 13.4° C. by differential scanning calorimetry (DSC).

Example 5

Preparation of Polyurethane-Modified Acrylic Resin

A reactor is equipped with a stirring device, a reflux condenser, a heating and temperature control device and a device for dropwise addition. Mixed solutions respectively composed of the components listed below were added successively. Component A, was added into the reactor firstly, stirred and heated to the reflux temperature of about 75° C. Then component B was slowly added dropwise into the reactor at the reflux temperature, and the total time for the addition was 3 hours, the reaction was continued at 75° C.-80° C. for 0.5 hour after addition. Component C was then slowly added in to the reactor within about 0.25 hour, the temperature of the reactants was controlled at 70-80° C. and the reaction was continued for 3 hours. Then, 10 kg of ethyl acetate and 10 kg of ethanol were added into the reactor and cooled with stirring; the substances in the reactor was taken out when the temperature therein was reduced to 50° C. or lower. Totally, 142.3 kg of polyurethane-modified acrylic resin having a solid content of 70% was prepared.

Weighing the raw materials according to the formulation below:

| | Component | Amount |
|---|---|---|
| component A | vinyl acetate | 20 kg |
| | butyl acrylate | 9 kg |
| | isopropanol | 8.5 kg |
| component B | monomer containing C=C and —NHCOO— (prepared in example 2, concentration of 50%) | 16 kg (weight of the solution) |
| | vinyl acetate | 20 kg |
| | butyl acrylate | 15 kg |
| | ethyl methacrylate | 13 kg |
| | butene diacide | 5 kg |
| | hydroxylpropyl acrylate | 8 kg |
| | arylic acid | 2 kg |
| | azo-bis-isobutyronitrile | 0.5 kg |
| component C | azo-bis-isobutyronitrile | 0.3 kg |
| | isopropanol | 5 kg |

The glass-transition temperature of the resin prepared in Example 5 was determined to be 14.5° C. by differential scanning calorimetry (DSC).

Example 6

Preparation of Polyurethane-Modified Acrylic Resin

A reactor is equipped with a stirring device, a reflux condenser, a heating and temperature control device and a device for dropwise addition. Mixed solutions respectively composed of the components listed below were added successively. Component A was added into the reactor firstly, stirred and heated to the reflux temperature at about 75° C. Component B was slowly added dropwise into the reactor at the reflux temperature and the total time for addition was 4 hours, the reaction was continued at 75° C.-80° C. for 1 hour after addition. Component C was then slowly added into the reactor within about 0.5 hour, the temperature of the reactants was controlled at 75-85° C. and the reaction was continued for 2.5 hours. Then, 30 kg of ethyl acetate and 41 kg of ethanol were added into the reactor and cooled with stirring; the substances in the reactor were taken out when the temperature therein was reduced to 40° C. or lower. Totally, 190.5 kg of polyurethane-modified acrylic resin having a solid content of 52% was prepared.

Weighing the raw materials according to the formulation below:

| | Component | Amount |
|---|---|---|
| component A | vinyl acetate | 15 kg |
| | methyl methacrylate | 10 kg |
| | isopropanol | 4 kg |
| component B | monomer containing C=C and —NHCOO— (prepared in example 2, concentration of 50%) | 20 kg (weight of the solution) |
| | vinyl acetate | 15 kg |
| | methyl methacrylate | 10 kg |
| | ethyl acrylate | 28 kg |
| | glycidyl acrylate | 5 kg |
| | methacrylamide | 7 kg |
| | benzoylperoxide | 0.1 kg |
| component C | benzoylperoxide | 0.4 kg |
| | isopropanol | 5 kg |

The glass-transition temperature of the resin prepared in Example 6 was determined to be 18.9° C. by differential scanning calorimetry (DSC).

Example 7

Preparation of Polyurethane-Modified Acrylic Resin

A reactor is equipped with a stirring device, a reflux condenser, a heating and temperature control device and a device for dropwise addition. Mixed solutions respectively composed of the components listed below were added successively. Component A was added into the reactor firstly, stirred and heated to the reflux temperature at about 75° C. Then component B was slowly added dropwise into the reactor at the reflux temperature and the total time for the addition was 3 hours, the reaction was continued at 75° C.-80° C. for 1 hour after addition. Component C was then slowly added into the reactor within about 0.5 hour, the temperature of the reactants was controlled around 80° C. and the reaction was continued for 2 hours. Then, 35 kg of ethyl acetate and 52 kg of ethanol were added into the reactor and cooled with stirring; the substances in the reactor were taken out when the temperature therein was reduced to 30° C. or lower. Totally, 206.9 kg of polyurethane-modified acrylic resin having a solid content of 48% was prepared.

Weighing the raw materials according to the formula below:

| | Component | Amount |
|---|---|---|
| component A | vinyl acetate | 23 kg |
| | butyl acrylate | 12 kg |
| | ethanol | 10 kg |
| component B | monomer containing C=C and —NHCOO— (prepared in example 2, concentration of 50%) | 12 kg (weight of the solution) |
| | vinyl acetate | 23 kg |
| | butyl acrylate | 12 kg |
| | methyl mathacrylate | 16 kg |
| | acrylic acid | 4 kg |
| | methacrylic acid | 4 kg |
| | azo-bis-isobutyronitrile | 0.6 kg |
| component C | azo-bis-isobutyronitrile | 0.3 kg |
| | ethanol | 3 kg |

The number average molecular weight (Mn) of the resin prepared in Example 7 was determined to be $3.8750 \times 10^4$ by gel permeation chromatography (GPC) with polystyrene as the standard reference.

The glass-transition temperature of the resin prepared in Example 7 was determined to be 15.9° C. by differential scanning calorimetry (DSC).

Example 8

Preparation of Ink Products Using the Resin of the Present Invention

The formulation for ink preparation using the resin of the present invention (amount by weight) is as follows:

Components

| Component | Amount |
| --- | --- |
| resin solution prepared in Example 3 (nonvolatile content of 50%) | 35 kg |
| titanium dioxide | 35 kg |
| micro-powdered wax | 1 kg |
| de-ionized water | 6-9 kg |
| industrial alcohol | 20-23 kg |

The production process for the ink sing the resin of the present invention comprises the following steps:
(1) Putting the above raw materials into a container, sufficiently mixing and uniformly dispersing by stirring at a high speed for 20 min;
(2) grinding in a sander until the fineness of ink being 15 μm or less, where the temperature of the materials was kept at 40° C. or lower.

Similarly, inks products were also prepared according to the same procedure by using the resin solutions prepared in Example 4 and Example 6 respectively, with the other conditions unchanged.

Properties and functions of ink products prepared in the prevent invention are shown in Table 1.

Example 9

Preparation of Laminating Adhesive Using the Resin of the Present Invention (1) Preparation of Curing Agent 278 kg of TDI and 90 kg of ethyl acetate were added into a reactor and mixed, then heated to 60° C. with stirring, then slowly adding 67 kg of trimethylolpropane (TMP) and 200 kg ethyl acetate, sufficiently react at 60-70° C. for 3 hours (the content of NCO measured by dibutyl amine titration became stable), stirring well, cooling and taking the final product out.

(2) The formulation of a laminating adhesive prepared using the resin of the present invention:

| Component | Amount |
| --- | --- |
| resin solution prepared in Example 5 (solid content of 70%) | 90 kg |
| TMP-TDI addition compound | 10 kg |

The above raw materials were put into a container, then 30 kg of ethyl acetate was added therein and stirring well to give the laminating adhesive solution.

Properties and functions of laminating adhesive prepared in the present invention are shown in Table 2.

Example 10

Metal Surface-Protective Coating Prepared Using the Resin of the Present Invention The formulation of a metal surface-protective coating prepared by using the resin of the present invention:

| Component | Amount |
| --- | --- |
| resin solution prepared in Example 3 (nonvolatile content of 50%) | 50 kg |
| titanium dioxide | 15 kg |
| antifoaming agent | 0.8 kg |
| leveling agent | 0.2 kg |
| anti-setting agent | 1 kg |
| ethyl acetate | 10 kg |
| butanol | 2 kg |
| ethanol | 21 kg |

The preparation procedure of metal surface-protective coating by using the resin of the present invention is as follows.

Putting the above raw materials into a container, stirring at high speed for 10 min, to mix well, then grinding in a sander until the fineness of ink being 15 μm or less.

Example 11

Gloss Varnish for Woodware Prepared Using the Resin of the Present Invention The formulation of a glossing varnish for wood ware prepared by using the resin of the present invention:

| Component | Amount |
| --- | --- |
| resin solution prepared in Example 4 (prepared by using the resin of the present invention: content of 50%) | 45 kg |
| nitro-cotton-alcochol solution (concentration of 70%) | 20 kg |
| dibutyl sebacate | 3 kg |
| ethyl acetate | 12 kg |
| butanol | 8 kg |
| ethanol | 12 kg |

The preparation procedure of gloss varnish for woodware by using the resin of the present invention is as follows.

Putting the above raw materials into a container, stirring for 10 min to mix well, then being subject to filtration to give the final product.

The alcohol soluble ink prepared in Example 8 and a reference acrylic resin ink were compared by testing according to QB/T2024-94, and the test method and the results are shown in Table 1.

TABLE 1

Test results of ink prepared in Example 8 as compared with a reference ink product (according to ink standard QB/T2024-94)

| Items | Standard Value | Test Value | | | | Test Method |
| --- | --- | --- | --- | --- | --- | --- |
| | | Ink using Ex. 3 resin | Ink using Ex. 4 resin | Ink using Ex. 6 resin | Ink using acrylic resin* | |
| Fineness μm | ≦25 | 15 | 14 | 16 | 15 | GB/T13217.3 |
| Viscosity, S | 25-70 | 30 | 35 | 38 | 30 | GB/T13217.4 |
| Initial Dryness, mm | 20-50 | 32 | 40 | 39 | 33 | GB/T13217.5 |
| Adhesion to substrate, % | ≧85 | 97 | 98 | 96 | 90 | GB/T13217.7 |
| Residual solvent, mg/m² | ≦30 | 10 | 8 | 6 | 12 | Headspace Gas Chromatography |

*Note: the reference ink of acrylic resin was prepared according to Example 5 of the Patent publication No. CN100480288C.

The results listed in Table 1 show that the inks prepared by using the resin of the present invention have adhesion strength much higher than 85% (the standard), and have low solvent residue and thereby no peculiar smells, and they are better than the reference ink. The inks prepared by using the resin of the present invention had been used by many printing companies and they were suitable for printing on films of BOPP, PE, PET, PA and the like, and similar printing effects were achieved even at different seasons, different temperatures and moistures, with different devices, and on different films.

The laminating adhesive prepared in Example 9 was applied to laminated films of BOPP/LDPE, PET/LDPE, and PA/LDPE, and the peeling strengths tested are shown in Table 2.

TABLE 2

Adhesive property of the composite adhesive

| Laminated film | T-Peeling Strength (N/15 mm) | |
| --- | --- | --- |
| | 40-50° C., 22-24 hr | After a week |
| BOPP/LDPE | 1.5-2.0 | BOPP torn up |
| PET/LDPE | >4 | PET torn up |
| PA/LDPE | >4 | PE destroyed |

Note:
BOPP—biaxially oriented polypropylene film;
PET—polyester film;
PA—nylon film;
LDPE—polyethylene film.

In Table 2, the peeling strength of the laminated films of BOPP/LDPE, PET/LDPE, and PA/LDPE prepared by using the laminating adhesive of Example 9 are listed. The laminating adhesive prepared by using the polyurethane-modified acrylic resin of the present invention has good stability, can be used for lamination of BOPP/LDPE-, PET/LDPE- and PA/LDPE packing materials films, which have peeling strength of more than 1.5 N/15 mm, and has high adhesion strength, especially for films of PET/LDPE and PA/LDPE, so that it completely meets the requirement for plastic laminated films for packaging.

According to GB/T10004-2008, the peeling strength of ordinary plastic laminated films and pounches for packaging should not less than 0.6 N/15 mm. Patent application with publication No. CN1740257A provided a use of acrylic acid laminating adhesive in a PET/PE film and determined the T-style peeling strength thereof to be 1.65-1.78 N/15 mm. Patent publication No. CN1035772C provided a acrylic acid adhesive, the T-style peeling strength of which is 2.7-3.2 N/25 mm (i.e. 1.62-1.92 N/15 mm) when used for PET/LDPE 1. The laminating adhesive prepared by the inventive resin has substantially improved T-style peeling strength when used for PET/LDPE film, and thereby has more and wide uses.

The peeling strength of the above products were measured as follows: applying a laminating adhesive on one side of a film with an coated amount of around 3 g/m², drying and hot-pressing to adhere at 70-80° C., then curing at 50° C. for 22-24 hours, cooling to room temperature, tailoring the obtained composite film to testing strips with 15 mm wide and 200 mm long, then measuring T-style peeling strength thereof at room temperature using BLD-200 Electronic Peel Testing Machine. Drawing speed was 100 mm/min.

The invention claimed is:

1. A method for preparing a polyurethane-modified acrylic resin, by solution polymerization comprising adding to a solution raw materials comprising the following monomers:
a monomer containing C=C and —NHCOO— in an amount of 2-10 parts by weight,
vinyl acetate in an amount of 30-60 parts by weight,
acrylic esters in an amount of 22-55 parts by weight, and
a compound containing an active functional group in an amount of 6-15 parts by weight;
wherein 0.2-1.1% of an initiator is added to the monomers, based on the total weight of the monomers, and
wherein the reaction temperature is at 70-85° C.

2. The method of claim 1, wherein the monomer containing C=C and —NHCOO— is prepared by using diisocyanate: hydroxylalkyl acrylate:aliphatic alcohol=1:1:1 mole ratio as raw materials, using ethyl acetate as a solvent, and under catalysis by a catalyst, wherein the reaction temperature for preparing the monomer containing C=C and —NHCOO— is at 40-50° C., and the reaction time for preparing the monomer containing C=C and —NHCOO— is 3-5 hours; the diisocyanate is any one or a mixture of two or more compounds selected from among toluene diisocyanate, methylene diphenyl diisocyanate, 1,6-diisocyanatohexane, isophorone diisocyanate, xylyl diisocyanate and 1,5-naphthalene diisocyanate, and the aliphatic alcohol is an aliphatic monobasic alcohol.

3. The method of claim 1, wherein the monomer containing C=C and —NHCOO— is prepared by using monoisocyanate:hydroxylalkyl acrylate=1:1 mole ratio as raw materials, using ethyl acetate as a solvent, and under catalysis by a catalyst, wherein the reaction temperature for preparing the monomer containing C=C and —NHCOO— is at 40-50° C. the reaction time for preparing the monomer containing C=C and —NHCOO— is 3-5 hours; and the monoisocyanate is methyl isocyanate or ethyl isocyanate or a combination thereof.

4. The method of claim 2, wherein the hydroxylalkyl acrylate is 2-hydroxylethyl(meth)acrylate or 2-hydroxylpropyl (meth)acrylate or a combination thereof; and the catalyst is an organic tin-based catalyst.

5. The method of claim 3, wherein the hydroxylalkyl acrylate is 2-hydroxylethyl(meth)acrylate or 2-hydroxylpropyl (meth)acrylate or a combination thereof; and the catalyst is an organic tin-based catalyst.

6. The method of claim 1, wherein the initiator is azo-bis-isobutyronitrile or benzoylperoxide or a combination thereof; and the solvent for the solution polymerization is an alcohol or ester solvent or a solvent combination thereof, comprising any one or a mixture of two or more solvents selected from ethanol, isopropanol and ethyl acetate.

7. The method of claim 1, wherein the acrylic ester is any one or a mixture of two or more acrylic esters selected from among methyl(meth)acrylate, ethyl(meth)acrylate, butyl(meth)acrylate, isooctyl acrylate and glycidyl(meth)acrylate; and wherein the compound containing an active functional group is any one or a mixture of two or more compounds selected from among an unsaturated monobasic acid, an unsaturated dibasic acid, a hydroxylalkyl ester of an unsaturated acid, an epoxy compound, an unsaturated amide and an N-hydroxylalkyl amide.

8. The method of claim 7, wherein the unsaturated monobasic acid is acrylic acid or methacrylic acid or a combination thereof, the unsaturated dibasic acid is butene diacid, the hydroxylalkyl ester of the unsaturated acid is 2-hydroxylethyl(meth)acrylate or 2-hydroxylpropyl(meth)acrylate or a combination thereof, the epoxy compound is glycidyl(meth)acrylate or an ester produced by reacting an unsaturated acid with a diepoxide or a combination thereof, the unsaturated amide is acrylamide or methacrylamide or a combination thereof, and the unsaturated N-hydroxylalkyl amide is hydroxylmethyl acrylamide.

9. The method of claim 1, wherein the number average molecular weight of the polyurethane-modified acrylic resin is 10,000-80,000.

10. The method of claim 1, wherein the raw materials comprise the following monomers:
a monomer containing C=C and —NHCOO— in an amount of 4-8 parts by weight,
vinyl acetate in an amount of 40-55 parts by weight,
acrylic ester in an amount of 30-50 parts by weight, and
a compound containing an active functional group in an amount of 6-10 parts by weight;
wherein 0.2-0.9% of an initiator is added to the monomers, based on the total weight of the monomers, and
wherein the reaction temperature is at 80° C.

11. The method of claim 2, wherein the reaction temperature for preparing the monomer containing C=C and —NHCOO— is at 40-45° C., and the reaction time for preparing the monomer containing C=C and —NHCOO— is 4 hours; and wherein the aliphatic alcohol is an aliphatic monobasic alcohol with 10 or less carbon atoms.

12. The method of claim 11, wherein the aliphatic alcohol is an aliphatic monobasic alcohol with 4 or less carbon atoms.

13. The method of claim 3, wherein the reaction temperature for preparing the monomer containing C=C and —NHCOO— is at 40-45° C., the reaction time for preparing the monomer containing C=C and —NHCOO— is 4 hours.

14. The method of claim 4, wherein the catalyst is stannous octanoate or dibutyltin dilaurate or a combination thereof.

15. The method of claim 5, wherein the catalyst is stannous octanoate or dibutyltin dilaurate or a combination thereof.

16. The method of claim 9, wherein the number average molecular weight of the polyurethane-modified acrylic resin is 30,000-50,000.

17. The method of claim 1, wherein the raw materials comprise the following monomers:
a monomer containing C=C and —NHCOO— in an amount of 4-8 parts by weight,
vinyl acetate in an amount of 30-60 parts by weight,
acrylic esters in an amount of 22-55 parts by weight, and
a compound containing an active functional group in an amount of 6-15 parts by weight.

18. The method of claim 1, wherein the raw materials comprise the following monomers:
a monomer containing C=C and —NHCOO— in an amount of 2-10 parts by weight,
vinyl acetate in an amount of 40-55 parts by weight,
acrylic ester in an amount of 22-55 parts by weight, and
a compound containing an active functional group in an amount of 6-15 parts by weight.

19. The method of claim 1, wherein the raw materials comprise the following monomers:
a monomer containing C=C and —NHCOO— in an amount of 2-10 parts by weight,
vinyl acetate in an amount of 30-60 parts by weight,
acrylic ester in an amount of 30-50 parts by weight, and
a compound containing an active functional group in an amount of 6-15 parts by weight.

20. The method of claim 1, wherein the raw materials comprise the following monomers:
a monomer containing C=C and —NHCOO— in an amount of 2-10 parts by weight,
vinyl acetate in an amount of 30-60 parts by weight,
acrylic ester in an amount of 22-55 parts by weight, and
a compound containing an active functional group in an amount of 6-10 parts by weight.

* * * * *